United States Patent
Ferguson et al.

(10) Patent No.: US 12,499,699 B2
(45) Date of Patent: Dec. 16, 2025

(54) SYSTEMS AND METHODS FOR EFFECT SIZE OPTIMIZATION OF OBJECT CLASSIFICATION

(71) Applicant: ARACELI BIOSCIENCES INC., Tigard, OR (US)

(72) Inventors: Kevin Ferguson, Beaverton, OR (US); Luke Ternes, Portland, OR (US)

(73) Assignee: ARACELI BIOSCIENCES INC., Tigard, OR (US)

( * ) Notice: Subject to any disclaimer, the term of this patent is extended or adjusted under 35 U.S.C. 154(b) by 321 days.

(21) Appl. No.: 18/318,364

(22) Filed: May 16, 2023

(65) Prior Publication Data
US 2024/0386731 A1 Nov. 21, 2024

(51) Int. Cl.
G06K 9/00 (2022.01)
G06T 7/00 (2017.01)
G06V 20/69 (2022.01)
G06V 20/70 (2022.01)

(52) U.S. Cl.
CPC .......... *G06V 20/698* (2022.01); *G06T 7/0012* (2013.01); *G06V 20/70* (2022.01); *G06T 2207/10056* (2013.01); *G06T 2207/10064* (2013.01); *G06T 2207/20081* (2013.01); *G06T 2207/20084* (2013.01); *G06T 2207/30024* (2013.01)

(58) Field of Classification Search
None
See application file for complete search history.

(56) References Cited

U.S. PATENT DOCUMENTS

| 12,148,157 B1* | 11/2024 | Li ..................... G06T 7/0012 |
| 2021/0279442 A1 | 9/2021 | Tracy et al. |
| 2021/0312620 A1 | 10/2021 | Zuo et al. |
| 2022/0172496 A1 | 6/2022 | Wilkinson et al. |

FOREIGN PATENT DOCUMENTS

EP     4060552 A1    9/2022

OTHER PUBLICATIONS

Sexton, J. et al., "Machine Learning and Assay Development for Image-based Phenotypic Profiling of Drug Treatments," Assay Guidance Manual, Mar. 15, 2023, 70 pages.
ISA Korean Intellectual Property Office, International Search Report and Written Opinion Issued in Application No. PCT/US2024/029510, Sep. 10, 2024, WIPO, 11 pages.

(Continued)

*Primary Examiner* — SJ Park
(74) *Attorney, Agent, or Firm* — McCoy Russell LLP

(57) ABSTRACT

Methods and systems are provided herein for automatic object classification. In an example, a method includes receiving one or more images of a plate including a plurality of wells, each well including a plurality of cells, the plurality of wells including a first control well, a second control well, and at least one test well, classifying one or more cells from the at least one test well using a trained classification model, the trained classification model trained based on training data including instance images of the first control well and the second control well formed from the one or more images of the plate and further based on an effect size loss function, and outputting an indication of the classified one or more cells.

12 Claims, 8 Drawing Sheets

(56) References Cited

OTHER PUBLICATIONS

Zhang, J. et al., "A Simple Statistical Parameter for Use in Evaluation and Validation of High Throughput Screening Assays," vol. 4, No. 2, Apr. 1999, 8 pages.

Bray, M. et al., "Cell Painting, a high-content image-based assay for morphological profiling using multiplexed fluorescent dyes," Nature Protocols, vol. 11, No. 9, Sep. 2016, Available Online Aug. 25, 2016, 42 pages.

Sauro, J., "5 Techniques to Identify Clusters in Your Data," Measuring U Website, Available Online at https://measuringu.com/identify-clusters/, May 31, 2017, 16 pages.

Rocca, J., "Understanding Variational Autoencoders (VAEs)," Towards Data Science Website, Available Online at https://towardsdatascience.com/understanding-variational-autoencoders-vaes-f70510919773, Sep. 23, 2019, 34 pages.

\* cited by examiner

SYSTEMS AND METHODS FOR EFFECT SIZE OPTIMIZATION OF OBJECT CLASSIFICATION

TECHNICAL FIELD

Embodiments of the subject matter disclosed herein relate generally to effect size optimization, and more specifically to effect size optimization of fluorescence microscopy bioassays.

BACKGROUND AND SUMMARY

Fluorescence microscopy-based bioassays often rely on the detection of differences in image features as a result of different treatments. For example, for drug discovery, human cells are grown and treated with candidate drugs and compared with cells that received no treatment and/or cells that received treatments with known responses. Metrics have been devised to quantify both the effect of treatment and the size of a given effect. For example, "hit (count)" is a metric for counting the number of cells that are characterized by features such as intensity, area, eccentricity, spots detected, and the like, beyond a given threshold. Further, Z' is an example of an effect size metric based on the measurement values of selected feature(s). Effect size has traditionally been used for cases where the features of interest are previously known. The effect size determines metrics, such as repeatability (e.g., variance) relative to the difference in mean value of positive and negative controls, respectively. In some examples, the effect size is used to verify or reject a feature as significantly different between the two control groups.

The choice of metrics is often complex and difficult due to unknowns and the complexity of the biochemistry. Biologists may spend many hours, days, or more time on developing a protocol for determining effect size, especially when focusing on both selecting the features and quantifying the associated metrics. For new, afore unseen treatment and effect combinations, the search for features and metrics, along with honing metric parameters (e.g., thresholds for counting hits, configurations for cell segmentation, focusing on one portion of the cell such as the nucleus, potentially ignoring mitotic cells, etc.), can be a very time consuming and iterative process with many potential dead-ends and local minima.

A method for automatically classifying objects (e.g., cells) is herein provided that addresses the above issues. In one example, a method includes receiving one or more images of a plate including a plurality of wells, each well including a plurality of cells, the plurality of wells including a first control well, a second control well, and at least one test well. The method includes classifying one or more cells from the at least one test well using a trained classification model. The trained classification model is trained based on training data including instance images of the first control well and the second control well formed from the one or more images of the plate. Further, the trained classification model is trained based on an effect size loss function. The model additionally includes outputting an indication of the classified one or more cells.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
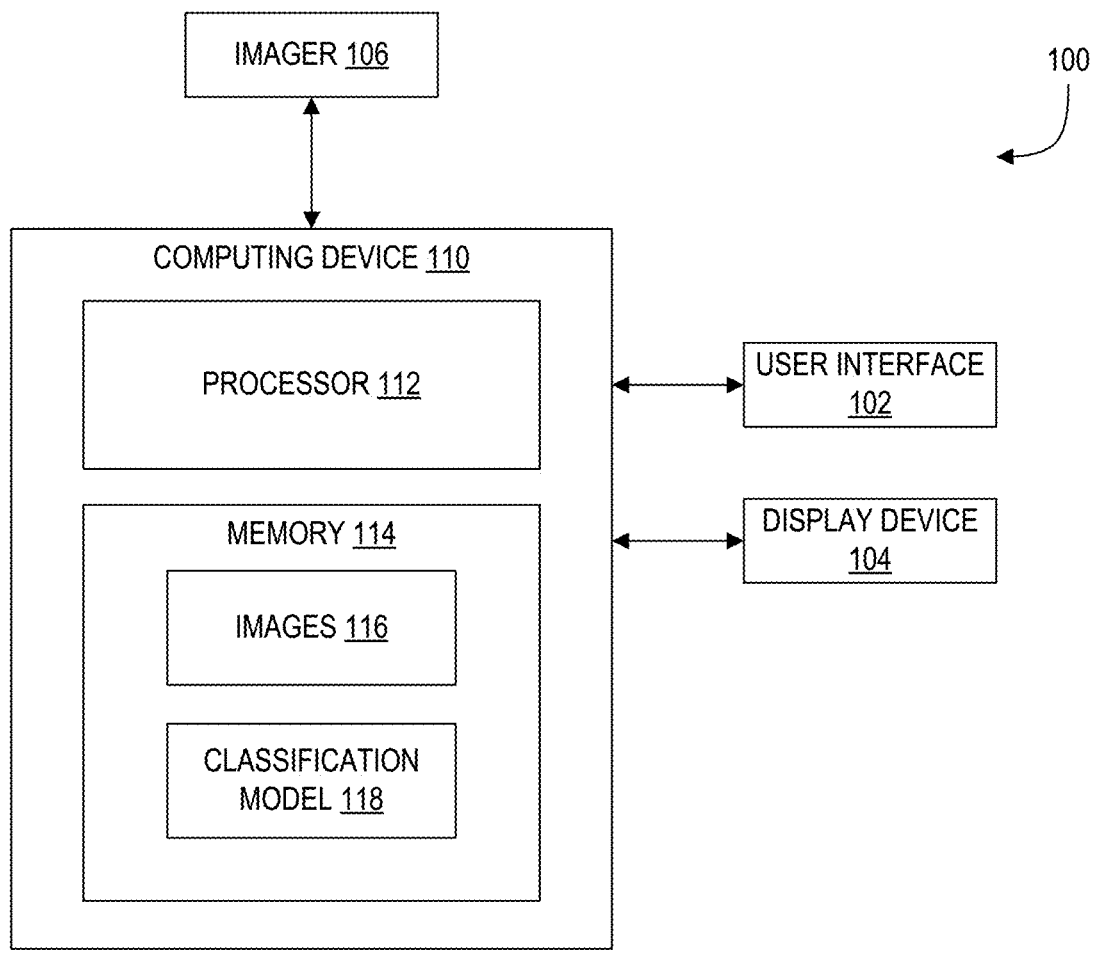
FIG. 1 is a diagram of a computing device.

The present description relates to effect size optimization of fluorescence microscopy bioassays. While the acquisition of data from fluorescence microscopy bioassays is becoming increasingly fast, meaningful analysis of the data has remained slow. Analysis of bioassay data may rely on the identification of relevant features, which may lead to many dead ends when dealing with novel treatments due to the inability to readily identify which features are relevant. Bioassay analysis may also include searching for metrics, such as effect size, to quantify identified features, as differences in features between controls may not be immediately obvious.

One common method for feature and effect size determination in fluorescence microscopy-based bioassays involves targeted staining of objects of interest. For example, for nuclear translocation, a dye may be chemically bonded to objects of interest that migrate from the cytosol to the nucleus. A metric measured in the nucleus (e.g., intensity, number of spots, etc.) may then be compared to the same metric measured to the cytosol. Even with such a well-defined method, there may be issues with dye penetration among cells, the definition of cytosol area boundaries due to non-uniform staining, or the definition of a spot (size, illumination and/or contrast threshold, etc.) if spots are used, in some examples. Further, if there is background emission due to dye leaking from cells, fluorescence from a plastic plate bottom, and/or channel cross-talk, the measurement may be skewed due to the cytosol intensity and/or spot count being inflated. Therefore, even with simpler, well defined bioassay protocols, image pre-processing and data post-processing is often necessary and often iterative. This means that new protocols are especially prone to being very time consuming, potentially taking weeks to determine experiment results.

Some methods for feature and effect size determination in fluorescence microscopy-based bioassays involve staining constituents of a cell that may be of interest, across many different lines of inquiry, metabolic circuits, etc. The stained constituents may be visible in multiple channels of a fluorescence microscope-based high content imaging system. The subsequent analysis involves a multitude of measurements, typically resulting in an enormous set of data and taking a substantial amount of time to accumulate relative to the time taken to acquire the images. The large measurement dataset is then analyzed using machine learning methods (e.g., principal component analysis for dimensionality reduction) followed by further analysis (e.g., clustering to determine if distinct classes can be statistically determined). If distinct classes emerge from the data, they may be the basis of another round of analysis through more refined metrics to determine the effects of the treatment.

Given the recent leaps in fluorescence microscopy and other technology related to high content screening and analysis (HCS and HCA), the time taken by the abovementioned methods to acquire and/or process experimental results is becoming an increasingly large bottleneck to molecular biology research. The inventors herein have recognized this issue and present methods that can automatically and rapidly determine relevant features that maximize an effect size metric, such as $Z'$. Such methods open the associated bottleneck, thereby dramatically accelerating molecular biology research in general and saving significant portions of development time and money.

Thus, according to embodiments disclosed herein, a classification model may automatically classify fluorescently labeled cells from an image of a well plate. The classification model may receive as input the well plate image and a plate map containing the location of each well on the plate. The data provided by the plate map allows the classification model to identify cells belonging to the positive and negative control wells and to automatically annotate an image of each cell with a ground truth annotation. As such, the classification model can rely on data that is already routinely generated instead of annotated datasets. Each annotated dataset takes time to produce, and the reduction of required annotation may save researchers significant amounts of time and effort. Further, a cost function used to train the classification model may be based on an effect size metric, such as $Z'$. A $Z'$ based cost function allows the classification model to automatically optimize the effect size via a selection of cell features that result in a good separation between classes.

Turning now to the figures, FIG. 1 shows an exemplary computing system 100, according to an embodiment. The computing system 100 includes a computing device 110, which further includes a processor 112 and a memory 114. The processor 112 may comprise one or more computational components usable for executing machine-readable instructions. For example, the processor 112 may comprise a central processing unit (CPU) or may include, for example a graphics processing unit (GPU). The processor 112 may be positioned within the computing device 110 or may be communicatively coupled to the computing device 110 via a suitable remote connection.

The memory 114 may comprise one or more types of computer-readable media, including volatile and/or non-volatile memory. The volatile memory may comprise, for example, random-access memory (RAM), and the non-volatile memory may comprise read-only memory (ROM). The memory 114 may include one or more hard disk drive(s) (HDDs), solid state drives (SSDs), flash memory, and the like. The memory 114 is usable to store machine-readable instructions, which may be executed by the processor 112. The memory 114 is further configured to store images 116, which may comprise digital images captured or created using a variety of techniques, including digital imaging, digital illustration, and more. The images 116 may be split into one or more instance images, where each instance image is an image of an individual cell. Instance images (e.g., cells) may be classified via a classification model 118 that is stored in the memory 114 of the computing device 110.

At least a portion of the images 116 may be acquired via an imager 106. The imager 106 may be one or more of a microscope (e.g., a light microscope, a fluorescence microscope), a multi-well plate imager, and another type of bioassay imager, for example. The imager 106 may include one or more light sources, including broad and/or narrow spectrum light sources. Examples of broad spectrum light sources include light sources that emit light over a wide wavelength range, such as lamps (e.g., mercury lamps, halogen lamps) that emit light spanning the ultra-violet (UV) and visible ranges. Examples of narrow spectrum light sources include light sources that emit light from a narrow wavelength range or wavelength band, such as light-emitting diodes (LEDs) and lasers. The imager 106 may further include at least one image sensor, such as a charge-coupled device (CCD), an electron multiplying CCD (EMCCD), an active pixel sensor (e.g., a complementary metal-oxide-semiconductor, or CMOS, sensor), or another type of sensor that detects light in a location-specific manner, such as in an array-based fashion. Additionally, the imager 106 may include one or more optical coupling devices (e.g., lenses and mirrors), filters, beam splitters, and the like that may be used to direct light of a desired wavelength or wavelength range to a sample being imaged and receive light transmitted by, reflected by, or emitted by (e.g., depending on the imaging modality) the sample at the image sensor(s).

The memory 114 further includes a classification model 118, which comprises machine-readable instructions that may be executed by the processor 112 to classify one or more instance images of the images 116. The processor 112 may utilize the machine-readable instructions contained by the classification model 118 for classification of digital images (e.g., the images 116) into one or more classes, examples of which are provided herein. The classification model 118 may be comprised of one or more deep neural networks (DNNs). Each DNN may be a convolutional neural network (CNN), comprising efficient convolutional layers and one or more fully connected layers, and the classification model may score images (e.g., the images 116) for how well they match each DNN class. For example, the machine-readable instructions stored in the classification model 118 may correspond to a DNN for classifying cells into a first class (e.g., a positive class) and a second class (e.g., a non-positive class).

The computing system 100 further includes a user interface 102, which may comprise one or more peripherals and/or input devices, including, but not limited to, a keyboard, a mouse, a touchpad, or virtually any other input device technology that is communicatively coupled to the computing device 110. The user interface 102 may enable a user to interact with the computing device 110, such as to select one or more images to evaluate, to select one or more parameters of the classification model, and so forth.

The computing system 100 further includes a display device 104, which may be configured to display outputs of the classification model 118, display the images themselves, and/or display possible parameter options and selections. In some examples, the display device 104 may be a liquid crystal display (LCD), a light-emitting diode display (LED), or an organic light-emitting diode display (OLED). The user may select or otherwise input parameters via the user interface 102 based on options displayed via the display device 104. Further, in some examples, visualizations of the output of the classification model 118 such as annotated images (e.g., the image 500 of FIG. 5), heat maps (e.g., the heat map 600 of FIG. 6), bar graphs, and scatter plots may be displayed via the display device 104.

In some examples, the computing device 110 may be implemented over a cloud or other computer network. For example, the computing device 110 is shown in FIG. 1 as constituting a single entity, but it is to be understood that the computing device 110 may be distributed across multiple devices, such as across multiple servers. Processors of the computing device may be single core or multicore, and the programs executed thereon may be configured for parallel or distributed processing. A logic subsystem of the computing device (e.g., memory) may optionally include individual components that are distributed throughout two or more devices, which may be remotely located and/or configured for coordinated processing. One or more aspects of the logic subsystem may be virtualized and executed by remotely accessible networked computing devices configured in a cloud-computing configuration. For example, the images 116 may be stored in the memory 114 of the computing device 110 and accessed by a classification model 118 on a remote device. Output from the classification model on the remote device may be sent back to the computing device 110 for storage in the memory 114.

Figure 2:
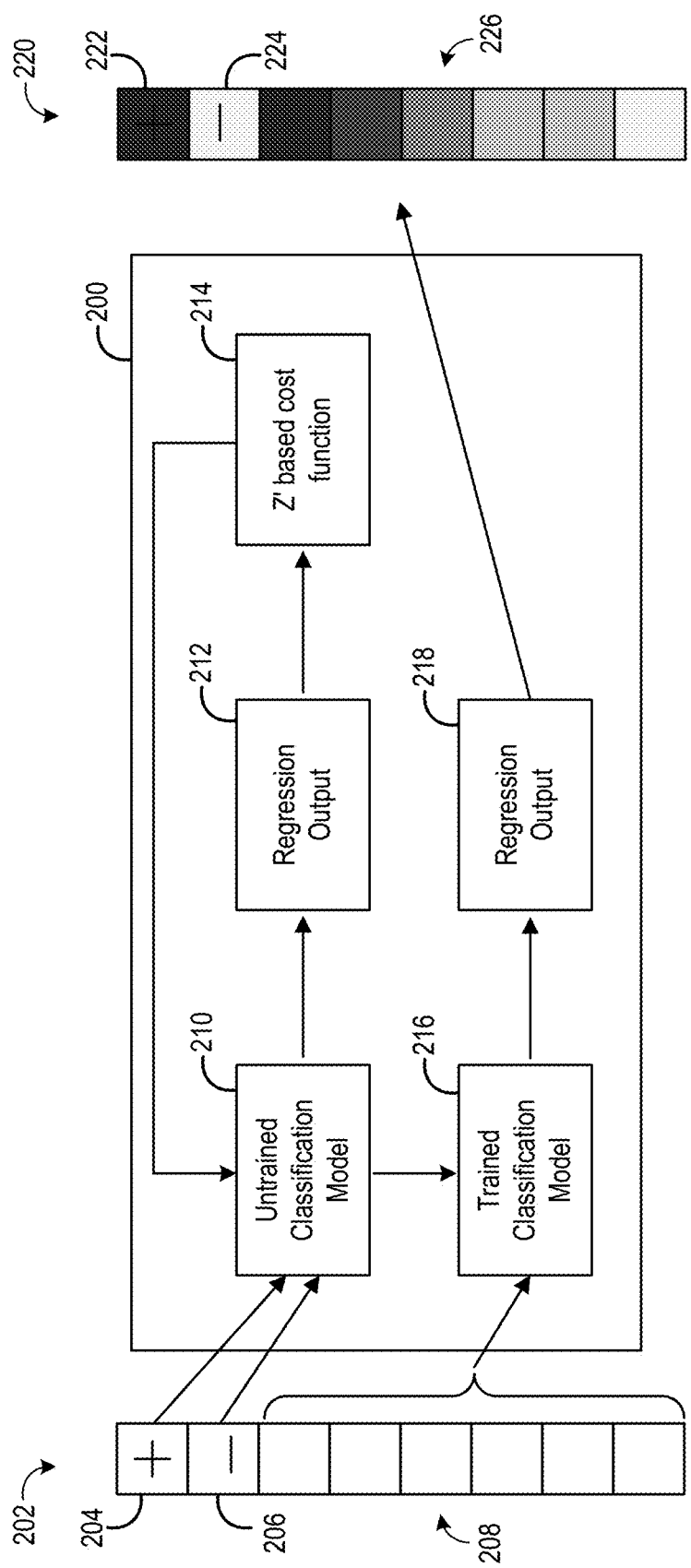
FIG. 2 is a schematic diagram of a process for classifying cells of a well plate.

FIG. 2 illustrates an example process 200 for classifying cells of a well plate. The process 200 may be carried out by a computing device, such as the computing device 110 of FIG. 1. Further, in some examples, the process 200 may be stored in memory and executed by a processor, such as the memory 114 and the processor 112 of FIG. 1.

The process 200 may receive as input one or more images of a well plate including a plurality of wells 202 that includes a positive control well 204, a negative control well 206, and a plurality of test wells 208. Each cell in the plurality of wells 202 may be fluorescently labeled (e.g., stained, tagged, etc.) by a fluorescent dye, a fluorescent tag, or another suitable fluorescent marker. As such, the fluorescent labeling may allow one or more cellular structures of interest to be visible via a fluorescence microscope based high content imaging system or other suitable imaging system (e.g., the imager 106 of FIG. 1). In some examples, additionally or alternatively, the cells in the plurality of wells 202 may be labeled with non-fluorescent dyes or tags, such as hematoxylin and eosin (H&E), methylene blue, Giemsa, 4',6-diamidino-2-phenylindole (DAPI), etc.

Cells in the positive control well 204 may be known or expected to exhibit an effect of interest (which may include known/expected visible features, known/expected reaction to an applied reagent/environmental disturbance, or other known or expected observable effects). For example, cells in the positive control well 204 may be or have been exposed to a relatively high concentration of a known reagent (e.g., a drug, a solvent, etc.). Cells in the negative control well may not be known or expected to exhibit the same effect as the cells of the positive control well 204. For example, the cells in the negative control well 206 may have been exposed to a minimal amount of the same reagent (e.g., none of the reagent) that the cells in the positive well were exposed to. The effect of the cells contained in the plurality of test wells 208 may be unknown or not expected. For example, the cells in the plurality of test wells 208 may have been exposed to a varying amount of the same reagent, a different reagent, and/or combination of reagents. The process 200 may compare visible features of cells in the plurality of test wells with the visible features exhibited by cells in the positive control well and/or the negative control well.

The process 200 splits each image of the plurality of wells 202 into a plurality of instance images, where each instance image may include a single cell. The process 200 may receive as input a plate map or other file including information indicating the location and identity (e.g., positive or negative control, test well, drug, reagent, other treatment dosage and/or duration, etc.) of each well, including the location of the positive control well 204, the negative control well 206, and the location of each test well. As such, the plate map may provide information that may be used to automatically generate an annotation regarding well classification for each instance image used for model training, as explained in more detail below.

Instance images belonging to the positive control well 204 and the negative control well 206 are input as training data into an untrained classification model 210. Additionally, the untrained classification model 210 may receive a well classification (based on the well location and identity) for each instance image, which may act as a ground truth label for that instance image. As such, each instance image may have ground truth annotation as being from the positive control well 204 or the negative control well 206. In some examples, the ground truth annotation for each instance image may be represented as a one and a zero for the positive control well and the negative control well, respectively. The instance image and ground truth annotation may be input into the untrained classification model as a training data pair.

In some examples, the untrained classification model 210 may be a convolutional neural network. The untrained classification model 210 may include a set of initial hyperparameters. The hyperparameters may be set by a user, or may be default or automatically selected hyperparameters. Each instance image may be passed through the untrained classification model 210 and may be assigned a regression value based at least in part on the initial hyperparameters. The regression value may take the form of a probability or a score and may represent the likelihood that an instance image belongs to the class of positive cells (e.g., came from the positive control well 204). The regression value for each instance image may be output by the untrained classification model as part of a regression output 212.

Further, the regression output 212 may include a mean regression value and a standard deviation of regression values for the entire population of instance images belonging to the positive control well 204. The population of instance images belonging to the positive control well 204 may be determined by the ground truth annotation assigned to each instance image via the plate map or other file containing well location and identification information. Similarly, the regression output 212 may include a mean regression value and a standard deviation of regression values for the population of instance images belonging to the negative control well 206.

The process 200 uses the individual regression scores, the mean regression scores, and the standard deviation of regression scores of the regression output 212 to determine a Z' based cost function 214. The Z' based cost function 214 includes a positive loss value, a negative loss value, and a Z' loss value, each of which may be multiplied by a predetermined coefficient of weight. As such, the process 200 may determine a loss for the instance images of the positive control well 204 (e.g., the positive loss) separately from a loss for the instance images takes from the negative control well 206 (e.g., the negative loss). To determine the positive loss, the process 200 may iterate over all instance images of the positive control well 204. The regression value (e.g., as determined by the untrained classification model 210) and ground truth annotation (e.g., one or zero depending on well location) of each instance image may be used in a standard loss function, such as a mean squared error function, to determine a loss for each instance image. The losses of all instance images of the positive control well are summed, producing a scalar value corresponding to the positive loss (e.g., a quantification of mislabeling) for instance images of the positive control well.

To determine the negative loss, the process 200 may iterate over all instance images of the negative control well 206. The regression value (e.g., as determined by the untrained classification model 210) and ground truth annotation (e.g., one or zero depending on well location) of each instance image may be used in a standard loss function, such as a mean squared error function, to determine a loss for each instance image. The losses of all instance images of the negative control well 206 are summed, producing a scalar value corresponding to the negative loss (e.g., a quantification of mislabeling) for instance images of the negative control well.

Additionally, the process 200 determines the Z' loss value which may be equal to 1−Z'. Z' is a measure of the separation between instance images of the positive control well 204 and instance images of the negative control well 206. As such, Z' may be determined based on the mean and standard deviation of the regression values for the positive cell population and the negative cell population, as described in reference to FIG. 4. The positive loss value, the negative loss value, and the Z' loss value may each be multiplied by a weight coefficient and the products summed to determine the value of the Z' based cost function 214.

The Z' based cost function 214 may be utilized for backpropagation of the untrained classification model 210. Hyperparameters (e.g., model architecture, learning rate, and/or other variables) of the untrained classification model 210 may be adjusted based on the value of the Z' based cost function 214, in order to minimize the value of the Z' based cost function. Once the untrained classification model has been adjusted, the above steps may be repeated, resulting in a new regression output 212 and a new Z' based cost function 214, until the untrained classification model has been sufficiently trained. In some examples, the untrained classification model may be considered sufficiently trained when the value of the Z' based cost function has dropped below a specified threshold value. In other examples, the untrained classification model may be considered sufficiently trained when the change in Z' based cost function values between subsequent training cycles has dropped below a specified threshold value. In still other examples, the untrained classification model may be considered sufficiently trained after a specified amount of time and/or cycles of training.

Once sufficiently trained, the untrained classification model 210 becomes a trained classification model 216. Instance images belonging to the positive control well 204, the negative control well 206, and the plurality of test wells 208 are input as input data into the trained classification model 216. Additionally, the trained classification model 216 may receive a well location and identity for each instance image. As such, each instance image may be assigned to one population of instance images where each population corresponds to one well of the plurality of wells 202.

The trained classification model 216 includes the final set of hyperparameters as determined by the untrained classification model 210. Each instance image is passed through the trained classification model 216 and is assigned a regression value based at least in part on the current hyperparameters. The regression value may take the form of a probability or a score and may represent the likelihood that an instance image belongs to the class of positive cells (e.g., came from the positive control well 204). The regression value for each instance image may be output by the trained classification model as part of a regression output 218.

The regression output 218 may further include a mean regression value and a standard deviation of regression values for each population of instance images (e.g., each well of the plurality of wells 202). Additionally, the regression output 218 may include a Z' score corresponding to an amount of separation between instance images belonging to the positive class of cells and instance images not belonging to the non-positive class of cells. The population means, population standard deviations, and Z' value may be used to determine the effects that the contents of each well of the plurality of wells 202 had on cells contained in that well.

The process 200 may include as output one or more visualizations of the regression output 218, such as a heat map 220. The heat map 220 may include a positive control well 222, a negative control well 224, and a plurality of test wells 226, which are a representation of the positive control well 204, the negative control well 206, and the plurality of test wells 208, respectively. Further, in some examples, the heat map may be shaded in accordance to the mean regression score that the process 200 assigned to each well. As such, in the illustrated example, the positive control well 222 may have the darkest shading and the negative control well 224 may have the lightest shading. The plurality of test wells 226 may have varying amounts of shading based on the contents of each well (e.g., based on the classification of the cells in each well relative to the positive control well and/or negative control well). In other examples, the heat map 220 may be shaded in accordance to the number of instance image regression scores in each well that are above a specified threshold value. In this way, the heat map 220 may help in visualizing the number of cells in each well of the plurality of test wells 208 that are at least partially similar to the cells in the positive control well 204.

Figure 3:
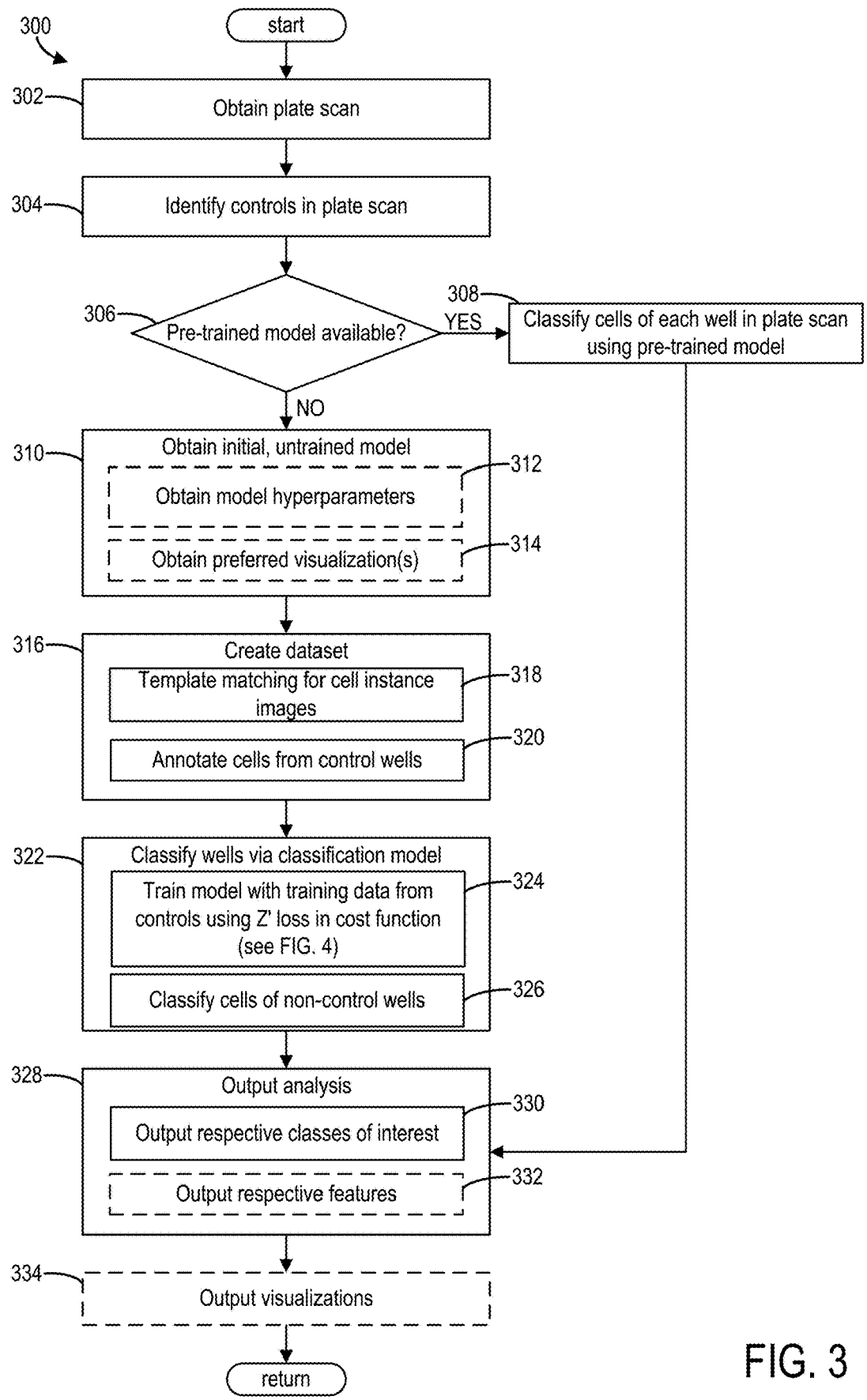
FIG. 3 is a flowchart illustrating a method for classifying cells with a classification model.

FIG. 3 is a flowchart that illustrates a method 300 for classifying cells using a classification model with a Z' based cost function. The method 300 may include both training of the classification model and inference using the trained classification model. The classification model may be a non-limiting example of the classification model 118 of FIG. 1 and/or the untrained classification model 210 and the trained classification model 216 of FIG. 2. Method 300 may be carried out by a computing device, such as the computing device 110 of FIG. 1 (e.g., by executing instructions stored in memory of the computing device).

At 302, the method 300 includes obtaining a plate scan. The plate scan may be obtained by an imaging device (e.g., imager 106 of FIG. 1), such as a plate reader. As such, the plate scan may include one or more images of a plurality of wells of a plate, where each well is a discrete area of the plate. The plate may include a positive control well, a negative control well, and at least one test well. Each well imaged in the plate scan may include one or more cells that are labeled (e.g., stained, tagged, etc., whether fluorescently and/or non-fluorescently) for the visualization of particular cell structures. The plate scan obtained at 302 may further include a plate map or other information indicating the location and identity of each well of the plate (e.g., controls/known effects, tests/unknown effects).

In some examples, the plate scan may be replaced by image(s) of slides and/or dishes, including a positive control slide, a negative control slide, and at least one test slide. Each slide and/or dish may include one or more cells that are labeled (e.g., stained, tagged, etc., whether fluorescently and/or non-fluorescently) for the visualization of particular cell structures. Further, a manually or automatically generated file may include information on the identity of each slide and/or dish (e.g., controls/known effects, tests/unknown effects).

At 304, the method 300 includes identifying controls in the plate scan. The plate scan may include image(s) of a positive control well and a negative control well. The cells in the positive control well may exhibit a first known or expected effect, and may be or may have been exposed to a relatively high concentration of a known reagent (e.g., a drug, a solvent, etc.). The cells in the negative control well may exhibit a second known or expected effect, and may have been exposed to a minimal amount of the same reagent (e.g., none of the reagent) that the cells in the positive well were exposed to. As such, cells in the negative control well may be known to not exhibit the same effect as the cells of the positive control well. The positive control well and the negative control well may be identified via the plate map or another file that includes the information of the location/identity of each well. As such, the plate map may provide information that may be used to automatically generate an annotation regarding well location for each instance image. In this way, data that is already routinely generated may be used to annotate cell images, reducing the number of human-annotated datasets and the time required to create them. In some examples, information regarding the location and identity of each well may be obtained from a source other than a plate map, such as user input. For example, a user may input information via a user interface (e.g., the user interface 102 of FIG. 1) that indicates if each image is a positive control image, a negative control image, or a test image.

At 306, the method 300 includes determining if a pre-trained classification model is available. The pre-trained classification model may be a non-limiting example of the trained classification model 216 of FIG. 2. As such, the pre-trained classification model may already include a set of adjusted hyperparameters (e.g., model architecture, learning rate, etc.), adjusted for the specific analysis to be conducted on the plate scan (e.g., the cell type, administered drugs/reagents, positive and negative effects). For example, the classification model may be trained on a first plate according to the method described below, and the trained classification model stored in memory. When a second plate including similar cells (tagged/labeled in a similar manner) and positive and negative effects (e.g., the same treatment to the positive and negative control wells) is scanned for analysis, the pre-trained classification model stored in memory may be utilized to classify the cells. If a pre-trained model is available (e.g., YES in FIG. 3), the method 300 proceeds to 308, which includes classifying cells of each well in the plate scan using the pre-trained model. An instance image of each cell of the plate scan may be assigned a regression value, and the regression value may be compared with a threshold value to determine which class the cell belongs to. In some examples, each cell may be classified into a positive class of cells or a non-positive (e.g., negative) class of cells.

If a pre-trained model is not available (e.g., NO in FIG. 3), the method 300 proceeds to 310 to obtain an initial, untrained classification model. The untrained classification model may be a deep neural network having a suitable architecture, such as a convolutional neural network. In some examples, obtaining the untrained model may include obtaining hyperparameters of the untrained model at 312. Hyperparameters may be obtained via manual selection (e.g., user entered) or may be automatically selected based on the analysis to be performed (e.g., cell type, tags/labels, classification classes, etc.). In some examples, the hyperparameters include classes of interest (e.g., control types), training dataset size, dataset splits, maximum epochs, and threshold values (e.g., threshold for regression classification). In some examples, obtaining the untrained model may further include, as indicated at 314, obtaining one or more preferred visualizations for visualizing the classification output of the classification model (once trained and used for classifying cells in the test wells), which may be specified via user input in some examples. The visualizations may include heat maps, scatter plots, concentration response curves, histograms, and/or other visualizations.

At 316, the method 300 includes creating a dataset based on the image(s) from the plate scan and the plate map. The dataset may include information used in training and implementing the classification model. As such, the dataset may include instance images, where each instance image corresponds to one cell. The image(s) from the plate scan may be split into a plurality of instance images, and each instance image may be a portion of the dataset. In some examples, all images of every well may be processed into instance images, with each imaged cell being present in one respective instance image. In other examples, only a portion of the images may be processed into instance images (e.g., half of the images of every well) and/or only a portion of the imaged cells of each well may be present in the instance images. In some examples, an optional binary segmentation (foreground/background) model (e.g., deep neural network), pre-trained for cell (or other target object) segmentation, may be used to better isolate the cell (or other target object) for analysis.

Creating a dataset includes template matching for cell instance images at 318. Each instance image (e.g., cell image) may be automatically matched to a well based on location information from the plate map or similar file. In this way, each instance image may be paired with a well location in the dataset without human annotation. Creating a dataset further includes annotating cells from control wells at 320. Each instance image that belongs to a control well (e.g., the positive control well or the negative control well) may automatically receive a ground truth annotation used in training the classification model. Cell images belonging to the positive control well may be annotated with a ground truth value of 1.0, while cell images belonging to the negative control well may be annotated with a ground truth value of 0.0.

At 322, the method 300 includes classifying the wells of the plate via the classification model. The wells may be classified by classifying the cells in each well of the plate, using the classification model. Classifying the cells (and hence wells) may include training the untrained classification model with training data from controls using Z' loss in a cost function, as indicated at 324. Additional details about training the untrained classification model are described in reference to FIG. 4. Briefly, the instance images from the positive control well and corresponding ground truth labels (e.g., the annotations described above, such as a value of 1.0) may form a plurality of first training data pairs and the instance images from the negative control well and corresponding ground truth labels (e.g., the annotations described above, such as a value of 0.0) may form a plurality of second training data pairs. Each training data pair may be entered into the untrained classification model, which may output a classification score (e.g., a regression value) for each training data pair (e.g., instance image and ground truth label). Positive and negative loss may be calculated based on the difference between the output from the classification model and the ground truth label and used with an effect size loss, such as Z' loss, to update the model. The Z' loss may be equal to 1−Z', where Z' is a measure of the separation between features of cells visible in the instance images of the positive control well and instance images of the negative control well. Additionally, the cost function may include the positive loss and a negative loss corresponding to the measure of mislabeling that occurred for instance images from the positive control well and the negative control well, respectively. The positive loss, negative loss, and Z' loss may each be multiplied by a weight coefficient and the products summed to determine the value of the cost function.

The cost function may be utilized for backpropagation of updates to the classification model. Hyperparameters and variables of the classification model (e.g., weights, biases) may be adjusted based on the value of the cost function, in order to minimize the value of the cost function. Once the classification model has been adjusted, the above steps may be repeated, resulting in new regression values and/or a new cost function value, until the classification model has been sufficiently trained, as described in reference to the process 200 of FIG. 2.

Additionally, classifying the cells (and hence wells) includes classifying cells of non-control wells (e.g., test wells) at 326. The sufficiently trained classification model may take as input instance images from wells of the plate scan that are neither the positive control well nor the negative control well. Each instance image may be paired with a well location, and may be passed through the classification model. The classification model may assign each instance image a regression value (e.g., in a range of 0.0 to 1.0), corresponding to the likelihood of the cell in that image belonging to the class of positive cells (e.g., cells similar to cells from the positive control well). Each regression score may be compared with a threshold value, where the threshold value is in a range of 0.0-1.0, and classified into the class of positive cells or the class of non-positive cells. Instance images with a regression value greater than the threshold value may be classified into the class of positive cells while instance images with a regression value less than the threshold value may be classified into the class of non-positive cells.

At 328, the method 300 includes outputting analysis. Outputting analysis includes outputting respective classes of interest at 330. Each instance image may be output along with a well location and an assigned regression value. Further, the assigned class of interest, such as the positive class of cells or the non-positive class of cells, may be output for each instance image. Additionally, each well of the plate scan may be assigned a class of interest that is determined by the population of cells belonging to that well. A class of interest may be assigned to a well based on the number of cells in the well that belong to the positive class of cells, the mean regression value for all cells in the well, or another suitable metric.

In some examples, outputting analysis includes outputting respective features at 332. The classification model may assign a regression score to each instance image based on one or more features of the cell imaged in the instance image, such as brightness or location of fluorescent labels within the cell. The similarity of each feature may vary when comparing the positive class of cells to the non-positive class of cells. As such, in some examples, the classification model may be configured to identify which feature(s) contributed to the regression score/classification of that cell as well as which feature(s) minimized the value of Z' loss. Features may be measured for each cell (e.g., instance image) and dimensionality reduction (e.g., principal component analysis, linear discriminant analysis, uniform manifold approximation and projection, t-distributed stochastic neighbor embedding, etc.) may be applied to the features. The primary and secondary dimensions of each feature may then be used by the model to automatically select features with the largest effect size (e.g., difference between the positive population and the non-positive population). The automatic selection of features by the classification model may eliminate the time spent by researchers to iteratively parse through instance images in search of differentiating features. The respective features may be output by the classification model for further analysis of the overall treatment effect and/or of the isolated features.

At 334, the method 300 may include outputting visualizations. In some examples, the visualizations may illustrate the classes of interest that were assigned by the classification model. The number of cells classified as belonging to the positive class of cells and/or the mean regression score of a well may be represented by an image (e.g., the image 500 of FIG. 5) a bar graph, a heat map (e.g., the heat map 600 of FIG. 6), or other suitable visualization. Further, the features identified by the classification model may be used to represent a population of cells as a scatter plot or other suitable visualization. For example, a scatter plot may include axes that represent primary and secondary dimensions after dimensionality reduction (e.g., PCA, LDA, UMAP, T-SNE) has been applied to identified features of each cell, with each point of the scatter plot representing a respective individual cell.

In some examples, an indication of the one or more cell classifications may be output in addition to outputting one or more visualizations. In other examples, an indication of one or more cell classifications may be output and no visualizations may be output. The indication may include machine-readable instructions of each cell classification that may be saved in memory (e.g., the memory 114 of FIG. 1) of the computing device that includes the classification model and/or sent to another computing device.

Figure 4:
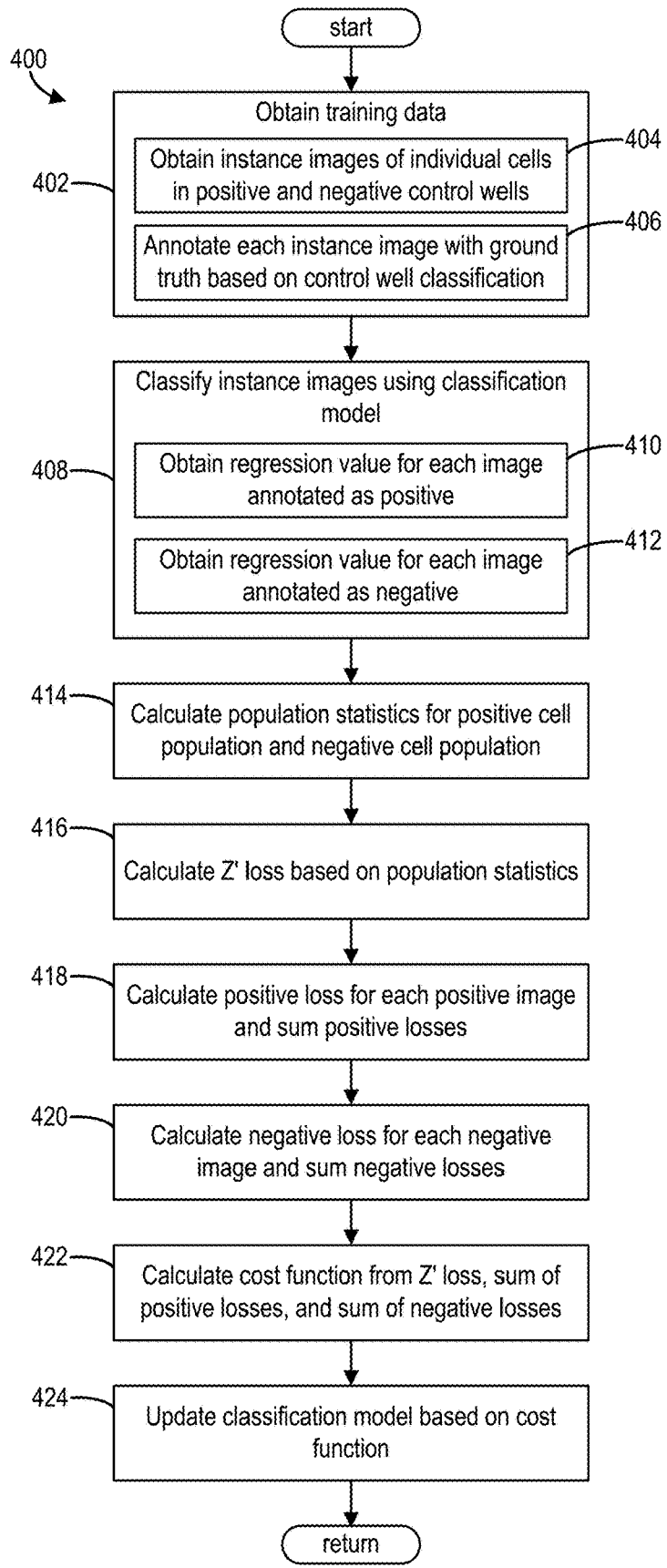
FIG. 4 is a flowchart illustrating a method for training a classification model with a Z' based cost function.

FIG. 4 is a flowchart that illustrates a method 400 for training a classification model with a Z' based cost function. The Z' based cost function may be a non-limiting example of the Z' based cost function 214 of FIG. 2. As such, the Z' based cost function may be utilized by a process to train a classification model via backpropagation. Method 400 may be carried out by a computing device, such as the computing device 110 of FIG. 1. In some examples, method 400 may be carried out as part of method 300 of FIG. 3, such as at 324 of method 300.

At 402, the method 400 includes obtaining training data. In some examples, training data may include one or more plate scans and a plate map. The plate scan may include a positive control well, a negative control well, and at least one test well, where each well contains one or more labeled cells (e.g., fluorescently labeled cells). Further, the plate map may include information of the contents and location of each well. Obtaining training data includes obtaining instance images of individual cells in positive and negative control wells at 404. Each plate scan may comprise one or more images, where each image may include at least a portion of a well. In some examples, the plate scan may be a single image including the positive control well, the negative control well, and at least one test well, while in other examples, the plate scan may include multiple images, such as one image per well or multiple images per well. Each image from the plate scan may be split into a plurality of instance images, where each instance image may include a single cell.

Obtaining training data includes annotating each instance image with ground truth based on control well classification at 406 to form training data pairs. A plate map may provide information used to automatically generate an annotation regarding well location and identification for each instance image. Instance images belonging to the positive control well and the negative control well may receive a ground truth label via information provided by the plate map. As such, each instance image from a control well may have ground truth annotation as being from the positive control well or the negative control well. In some examples, the ground truth annotation for each instance image may be represented as a 1.0 and a 0.0 for the positive control well and the negative control well, respectively.

At 408, the method 400 includes classifying the instance images of the training data using a classification model. In some examples, the classification model may be a convolutional neural network. In other examples, the classification model may be another machine learning model suitable for classifying objects of interest. The classification model may be an initial, untrained model with selected or default hyperparameters, as explained above with respect to FIG. 3.

Each instance image may be passed through the classification model and may be assigned a regression value based at least in part on the current hyperparameters (e.g., the untrained model may extract features from each instance image and pass the features through one or more convolutional, pooling, upsampling, and/or output layers to generate the regression value). The regression value may represent a probability or a score of the likelihood that an instance image belongs to the class of positive cells (e.g., is similar to cells from the positive control well). Thus, classifying the instance images using the classification model includes obtaining a regression value for each image annotated as positive at 410 (e.g., obtaining a regression value for each positive training data pair). A population of instance images belonging to the positive control well (e.g., instance images annotated as positive) may be determined by the ground truth annotation automatically assigned to each instance image via the plate map. Each instance image assigned a ground truth value corresponding to the positive control well may be passed through the classification model and assigned a regression value. As such, each cell from the positive control well may have an instance image, a ground truth annotation (e.g., a well location), and a regression value.

Classifying instance images using the classification model further includes obtaining a regression value for each image annotated as negative at 412 (e.g., obtaining a regression value for each negative training data pair). A population of instance images belonging to the negative control well (e.g., instance images annotated as non-positive) may be determined by the ground truth annotation automatically assigned to each instance image via the plate map. Each instance image assigned a ground truth value corresponding to the negative control well may be passed through the classification model and assigned a regression value. As such, each cell from the negative control well may have an instance image, a ground truth annotation (e.g., a well location), and a regression value.

At 414, the method 400 includes calculating population statistics for a positive cell population and a negative cell population. Population statistics for the positive cell population includes a mean regression value and a standard deviation of regression values for the entire population of instance images belonging to the positive control well (e.g., the mean regression value and the standard deviation of the regression values output by the classification model for the positive training data pairs). The population of instance images belonging to the positive control well may be determined by the ground truth annotation automatically assigned to each instance image via the plate map. Similarly, population statistics for the negative cell population includes a mean regression value and a standard deviation of regression values for the population of instance images belonging to the negative control well (e.g., the mean regression value and the standard deviation of the regression values output by the classification model for the negative training data pairs).

At 416, the method 400 includes calculating a Z' loss based on the population statistics. The Z' loss may be equal to 1−Z', where Z' is a measure of the separation between instance images of the positive control well and instance images of the negative control well. Z' may be represented by the following formula:

$$Z' = 1 - \frac{3 \times (\sigma_P + \sigma_N)}{|\mu_P - \mu_N|}$$

where σ and µ represent a standard deviation and a mean of a population, respectively, and P and N denote statistics taken from the positive control well and the negative control well, respectively. Thus, the Z' loss may be determined based on the mean regression value for the positive training data pairs, the mean regression value for the negative training data pairs, the standard deviation of the regression values of the positive training data pairs, and the standard deviation for the regression values of the negative training data pairs. As such, the value of Z' increases, and therefore the value of Z' loss decreases, as the difference between the mean regression values of the positive population of instance images and the negative population of instance images increases. Similarly, the value of Z' loss decreases as the standard deviations of regression values of the positive population and/or the negative population of instance images decrease.

At 418, the method 400 includes calculating a positive loss for each positive image and summing the positive losses. The loss for each instance image of the positive population may represent the degree to which that instance image was mislabeled by the classification model. The regression value (e.g., as determined by the classification model) and ground truth annotation (e.g., as determined by the plate map) of each instance image may be used in a standard loss function, such as a mean squared error function, to determine a loss for each instance image. In some examples, the regression value may be a value in a range of 0.0-1.0 and the ground truth annotation for the positive population may be 1.0. The losses of all instance images of the positive control well may be summed, producing a scalar value corresponding to the positive loss for instance images of the positive control well.

At 420, the method 400 includes calculating a negative loss for each negative image and summing the negative losses. The loss for each instance image of the negative population may represent the degree to which that instance image was mislabeled by the classification model. The regression value (e.g., as determined by the classification model) and ground truth annotation (e.g., as determined by the plate map) of each instance image may be used in a standard loss function, such as a mean squared error function, to determine a loss for each instance image. In some examples, the regression value may be a value in a range of 0.0-1.0 and the ground truth annotation for the negative population (e.g., the non-positive population) may be 0.0. The losses of all instance images of the negative control well may be summed, producing a scalar value corresponding to the negative loss for instance images of the negative control well.

At 422, the method 400 includes calculating a cost function from the Z' loss, the sum of positive losses, and the sum of negative losses. The cost function may be represented by the following formula:

$$\text{Cost} = W_1(L_P) + W_2(L_N) + W_3(L_{Z'})$$

Where $L_P$, $L_N$, and $L_{Z'}$ represent the positive loss, the negative loss, and the Z' loss, respectively. Further, $W_1$, $W_2$, and $W_3$ represent predetermined coefficients of weight based on the intended importance of each of the three loss terms, which may be selected by a user (e.g., the value of $W_3$ may be adjusted based on how much importance a user may want to give the effect size optimization). By including the Z' loss, the cost function may allow the classification model to automatically optimize effect size when classifying objects of interest.

At 424, the method 400 includes updating the classification model based on the cost function. The cost function may be utilized for backpropagation of the classification model. Hyperparameters and variables of the classification model may be adjusted based on the value of the cost function, in order to minimize the value of the cost function. Once the classification model has been adjusted, the above steps may be repeated, resulting in one or more new regression values and a new value of the cost function, until the classification model has been sufficiently trained. In some examples, the classification model may be considered sufficiently trained when the value of the cost function has dropped below a specified threshold value. In other examples, the classification model may be considered sufficiently trained when the change in cost function values between subsequent training cycles has dropped below a specified threshold value. In still other examples, the classification model may be considered sufficiently trained after a specified amount of time and/or cycles of training.

Thus, methods 300 and 400 described above provide for training a classification model to classify cells into two classes (e.g., positive or not positive; negative or not negative; positive or negative, etc.) based on how close the features of the cells match positive control cells (or negative control cells), using an effect size loss function in the training to optimize (e.g., maximize) the effect size and hence separation between the two classes. However, the above-described process may be utilized to classify cells based on other known features/effects besides classic positive and negative control cells, such as cells exhibiting a first known effect and cells exhibiting a second known effect but that is different than untreated or wild-type cells (e.g., all the control cells may be positive for an effect and hence exhibit different features than untreated cells but the effect the treated cells exhibit may be different).

As such, during training, the classification model may take images of cells in a first control well and a second control well as input, where the cells in the first control well have a first known effect and cells in the second control well have a second known effect. In some examples, the second known effect may be the absence of the first known effect while in other examples, the second known effect may be a different effect than the first effect, with the first effect and second effect each different than no effect/no treatment. The first control well and second control well may be automatically assigned a first ground truth label and a second ground truth label, respectively, via information from a plate map. First instance images taken from the first control well and corresponding first ground truth labels may each be input into the classification model as first training data pairs and assigned a classification score, which may be a regression value or a different value that reflects whether the classification model thinks the instance image exhibits the first effect, such as a binary classification (e.g., shows the first effect or does not show the first effect). Similarly, second instance images taken from the second control well and corresponding second ground truth labels may be input into the classification model as second training data pairs and assigned a classification score. The classification scores of the first instance images may be used in calculating a first mean classification score (e.g., a first mean regression value) and a first standard deviation of classification scores for the first control well. Similarly, the classification scores of the second instance images may be used in calculating a second mean classification score (e.g., a second mean regression value) and a second standard deviation of classification scores for the second control well.

Further, methods 300 and 400 described training and inference of a single classification model. However, in some examples, more than one classification may be utilized, such as a first classification model trained to output classification scores reflecting how well input instance images/cells match a first class of cells (e.g., positive control cells) and a second classification model trained to output classification scores reflecting how well input instance images/cells match a second class of cells (e.g., negative control cells). As such, the first classification model may classify instance images as belonging to a first class or as not belonging to the first class. The second classification model may classify cells as belonging to a second class or as not belonging to the second class. For example, the first classification model may classify cells as belonging to a positive class (e.g., similar to cells in a positive control well) or belonging to a non-positive class (e.g., not similar to cells in a positive control well). Further, the second classification model may classify cells as belonging to a negative class (e.g., similar to cells in a negative control well) or belonging to a non-negative class (e.g., not similar to cells in the negative control well). The first and second classification models may be trained as explained above with respect to FIG. 4.

In this way, multiple classification models may each be trained with a Z' based cost function. Each classification model may output a regression value corresponding to how likely it is for a cell to belong to a particular population of cells. In some examples, the regression values may be added and compared to a threshold value to determine the classification of a cell. In other examples, the regression values may be averaged, subtracted, or combined in another suitable way in order to be compared to single threshold value for classification. For example, one classification model may classify cells as positive or non-positive and may assign a higher regression value to cells that are more likely to be positive. A second classification model may classify cells as negative or non-negative and may assign a lower regression value to cells that are more likely to be negative. The two regression values may be added together and compared to a threshold value, averaged and compared to a threshold value, or combined in another suitable way and compared to a threshold value, in order for the cell to receive a final (e.g., overall) classification. Additionally, in some examples, multiple classification models may be used to split a complex classification with many classes into a finite number of binary classifications. Further, the regression value (e.g., classification score) assigned by each classification model to each instance image and ground truth label pair may be used to estimate the relative effects of multiple treatments on a single cell.

Figure 5:
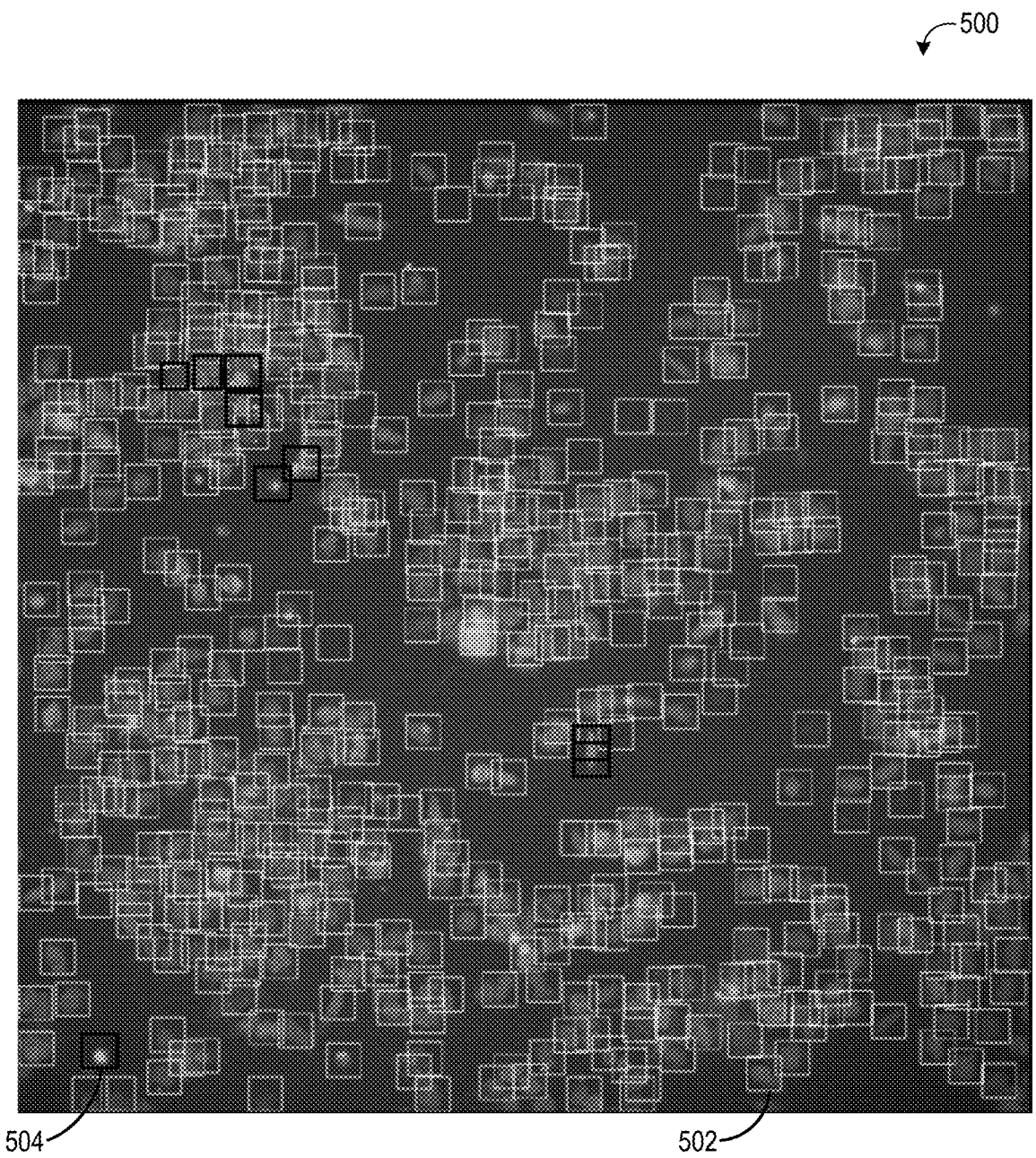
FIG. 5 is an example image of a positive control well.

FIG. 5 is an example image 500 of a positive control well of a well plate. The image 500 may be a non-limiting example of an image of the positive control well 204 of FIG. 2. As such, the cells in the image may have been treated with a high concentration of a reagent known to elicit an effect of interest. Further, each cell in the image may be fluorescently labeled and the image may have been acquired via a fluorescence microscope based high content imaging system.

The cells in the image 500 may be classified using a classification model as described herein (e.g., classification model 118). As such, each cell may have been assigned a regression value corresponding to the likelihood that the cell belongs to a positive class of cells. Each cell regression value may have been compared with a threshold value to determine if each cell belongs to the positive class of cells or to a non-positive class of cells. If the regression value of a cell is above the threshold value, then the cell may be classified into the positive class cells. In the illustrated example, cells classified into the positive class of cells are surrounded by a white bounding box, such as a bounding box 502. If the regression value of a cell is below the threshold value, then the cell may be classified into the non-positive class cells. In the illustrated example, cells classified into the non-positive class of cells are surrounded by a black bounding box, such as a bounding box 504.

A large majority (e.g., approximately 95%) of the cells in the image have been classified into the positive class of cells (e.g., cells bounded by a white bounding box). The classification model may have classified cells in the image 500 based on specific features of each cell. In some examples, cells classified into the positive class of cells may exhibit a different shape, size, and/or fluorescent intensity than cells classified into the negative class of cells. For example, the cell in the bounding box 502 may have a different shape, size and/or fluorescence intensity than the cell in the bounding box 504. The classification model may automatically distinguish between cells with feature differences by utilizing a value of Z' in a cost function when being trained. A Z' based cost function may allow the classification model to classify images based on features that give the greatest effect size, without a user having to manually identify the features. The image 500 may be an example visualization that may be output (e.g., for display) according to method 300 of FIG. 3.

Figure 6:
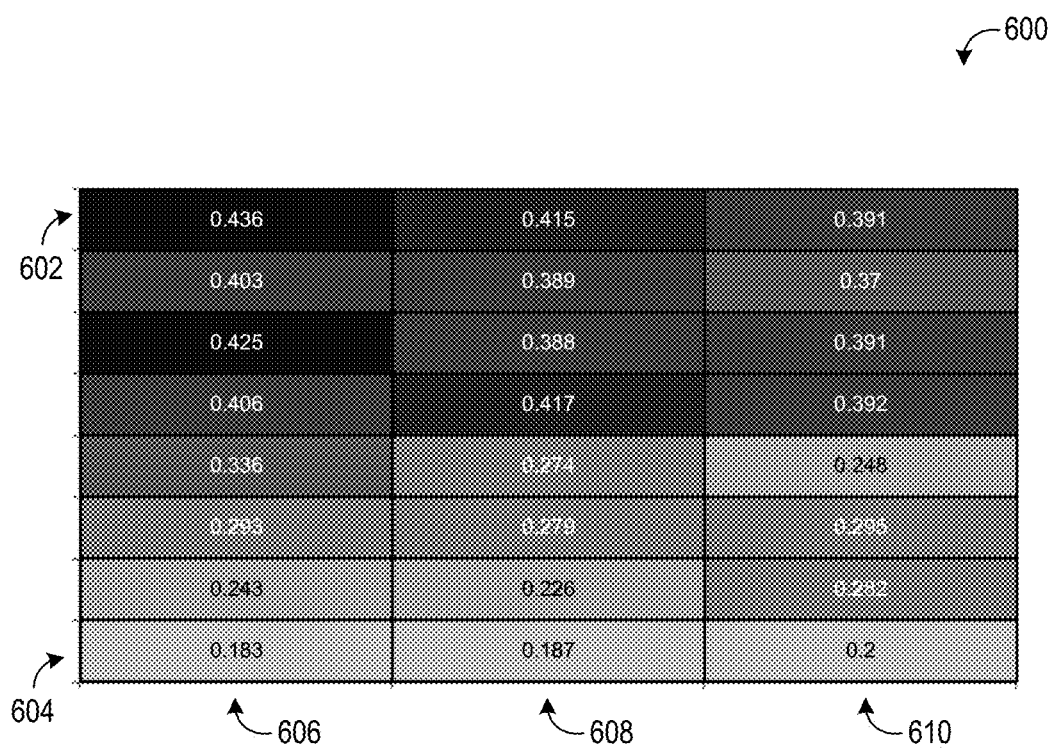
FIG. 6 is an example heat map of a plurality of wells of a well plate.

FIG. 6 is an example heat map 600 of a plurality of wells of a well plate, which may be an example visualization that may be output (e.g., for display) according to method 300 of FIG. 3. The heat map 600 includes twenty-four wells, organized into eight rows and three columns. The heat map 600 illustrates the mean regression value of cells for each well of the well plate, which may be calculated as described above with respect to FIG. 3. As such, the heat map may illustrate the mean likelihood that cells in a particular well belong to a positive class of cells (e.g., cells similar to cells of a positive control well).

Each well represented by the heat map 600 contains cells that have been exposed to a known reagent (e.g., a drug, a solvent, etc.). In the illustrated example, the cells in each well have been exposed to dimethylsulfoxide (DMSO). A first row 602 may include positive control wells, where cells in each of the positive control wells may have been exposed to a relatively high concentration of DMSO. Cells in the positive control wells may be known to exhibit an effect of interest. A last row 604 may include negative control wells, where cells in each of the negative control wells may have been exposed to a minimal concentration of DMSO (e.g., no DMSO). Cells in the negative control wells may be known to not exhibit the effect of interest. Cells in the remaining plurality of rows may have been exposed to various concentrations of DMSO, where each concentration may be between the concentrations used in the positive control well and the negative control well for a given column.

In some examples, the heat map 600 may represent a well plate that was used as input for an untrained classification model. As such, a first column 606 and a second column 608 may include wells that were both used for training the classification model and were subsequently classified by the classification model. A third column 610 may be a test column, and may include wells that were classified by the classification model but were not used to train the classification model. In other examples, the heat map 600 may represent a well plate that was used as input for a pre-trained classification model. As such, the first column 606 and the second column 608 may not have been used to train the classification model.

In the illustrated example, the heat map 600 is shaded (e.g., colored) according to the mean regression value of cells belonging to each well. As such, darker shading represents a larger mean regression value for cells in that well and lighter shading represents a smaller mean regression value. Additionally, the approximate mean regression value for each well is written within each represented well of the heat map 600. Wells with a higher mean regression value may include more cells that belong to a positive class of cells than wells with a lower mean regression score. For each of the first column 606, the second column 608, and the third column 610, the well in the first row 602 (e.g., the positive control wells) may be more darkly shaded and have a higher mean regression value than the well in the last row 604 (e.g., the negative control wells). Further, the mean regression values of the positive control wells in the first row 602 are approximately a factor of two larger than the mean regression values of the negative control wells in the last row 604. Such a separation in mean regression values illustrates that the classification model was able to automatically classify cells between the positive and non-positive classes.

In some examples, the heat map 600 may be shaded according to the number of cells in each well that are classified as belonging to the positive class of cells. The number of cells classified into the positive class of cells may be adjusted based on the threshold value used to determine if a regression value corresponds to a cell of the positive class or the non-positive class. In other examples, the heat map 600 may be shaded according to the percentage of cells in each well that are classified as belonging to the positive class of cells. In yet further examples, the heat map may be shaded according to any of the above metrics applied to the class of non-positive cells instead of the class of positive cells.

Figure 7:
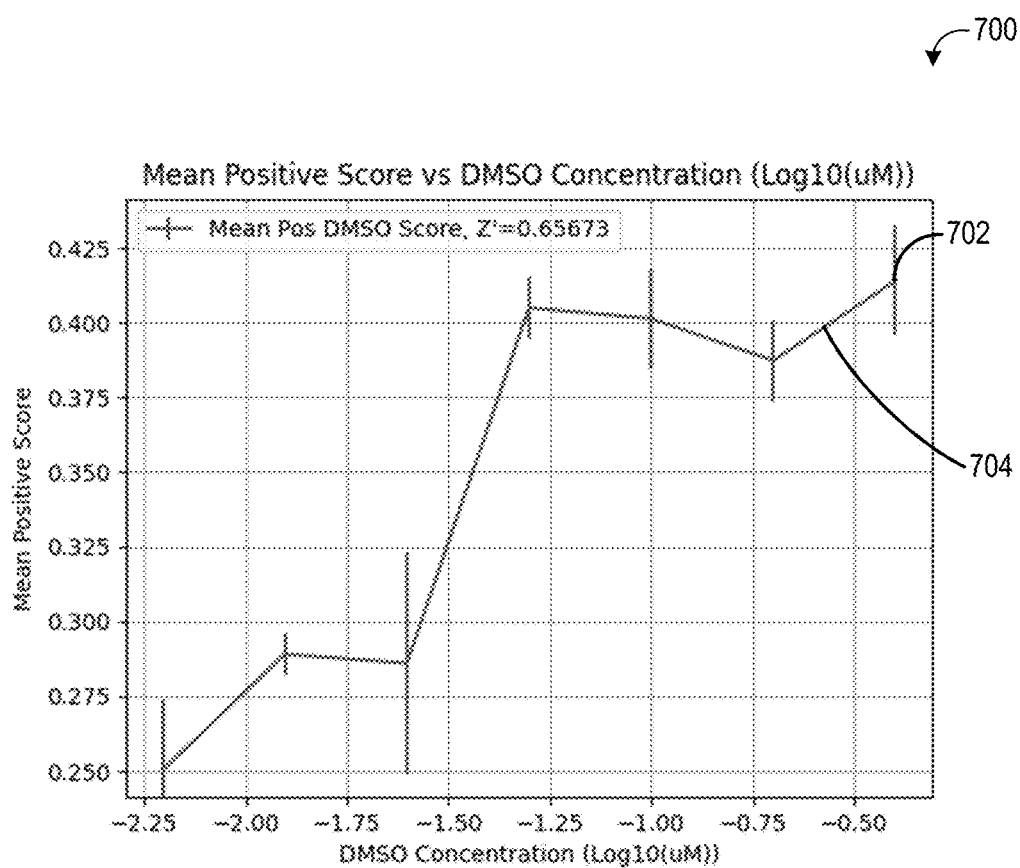
FIG. 7 is an example graph illustrating the mean positive score of a well as a function of a selected treatment concentration.

FIG. 7 is an example graph 700 that illustrates the mean positive score of a well as a function of DMSO concentration, which may be an example visualization that may be output (e.g., for display) according to method 300 of FIG. 3. The mean positive score of a well may be equal to the mean regression value of cells belonging to the well. In some examples, the DMSO concentration may refer to a concentration of DMSO that cells within the well were exposed to at a time point prior to imaging. In other examples, the DMSO concentration may refer to the concentration of DMSO that is in the well during imaging. The graph 700 may be an output of a process that includes a classification model, such as the process 200 of FIG. 2. Further, the classification model of the process may have been trained with a Z' based cost function.

An x-axis of the graph 700 represents the concentration of DMSO in units of $\log_{10}(\mu M)$. A y-axis of the graph 700 represents the mean positive score (e.g., mean regression value) of cells in a given well, where the mean positive score may have a value in a range of 0.0-1.0. The graph 700 may include a plurality of data points, such as a data point 702. Each data point of the graph may include error bars representing the standard deviation of the mean positive score.

A line 704 may connect the plurality of data points to illustrate the relationship between DMSO concentration and mean positive score. As illustrated by the line 704, the mean positive score generally increases as the concentration of DMSO increases. For example, the mean positive score is approximately 0.250 for a DMSO concentration of approximately $10^{-2.25}$ μM and the mean positive score increases to approximately 0.412 for a DMSO concentration of approximately $10^{-0.375}$ μM. As such, the classification model may assign larger regression values, on average, to cells that have been exposed to higher concentrations of DMSO and smaller regression values, on average, to cells that have been exposed to lower concentrations of DMSO. Further, the graph 700 may illustrate an effective concentration of DMSO, where the DMSO concentration may elicit an effect of interest. For example, at concentrations above approximately $10^{-1.25}$ μM, increasing DMSO concentration does not affect the mean positive score, and thus the effective concentration of DMSO may be equal to or lower than $10^{-1.25}$ μM, depending on the magnitude of the effect desired.

Figure 8:
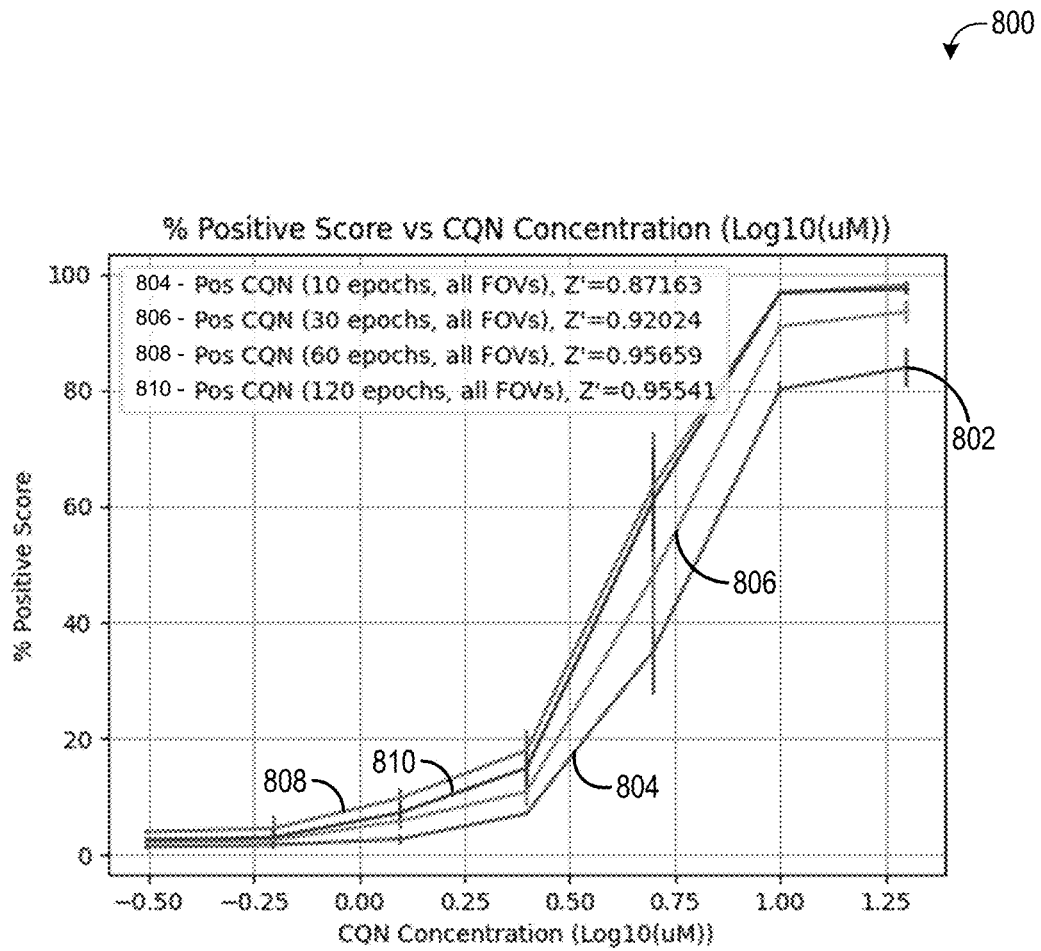
FIG. 8 is an example graph illustrating the relationship between the value of Z' output by a classification model and the number of training epochs that the classification model underwent.

FIG. 8 is an example graph 800 illustrating the relationship between the value of Z' output by a classification model and the number of training epochs that the classification model underwent. The graph 800 may be output by a process that includes a classification model, such as the process 200 of FIG. 2. Further, the classification model may have been trained using a Z' based cost function and may output regression values as described in reference to FIGS. 2-4.

An x-axis of the graph 800 represents the concentration of a drug administered to the cells (e.g., chloroquine (CQN)), in units of $\log_{10}(\mu M)$. A y-axis of the graph 800 represents a percentage of cells classified as belonging to a positive class of cells. A cell may be classified as belonging to the positive class of cells if the assigned regression value for that cell is above a threshold value. As such, the classification model may classify cells into the class of positive cells by assigning cells a regression value that is greater than the threshold value.

The graph 800 includes a plurality of data points such as a data point 802. Each data point including the data point 802 may represent the percentage of cells in a well that were assigned a regression value above the threshold value after the cells had been exposed to a specified concentration of CQN. For example, the data point 802 may correspond to a well that has been exposed to a CQN concentration of approximately $10^{-1.3}$ μM, and where approximately 83% of the cells belonging to the well were classified as belonging to the positive class of cells. Further, each data point of the graph may include error bars representing the standard deviation of the percentage positive score.

The graph 800 may include a first line 804, a second line 806, a third line 808, and a fourth line 810, where each line corresponds to data output by the classification model after a different number of training epochs. The first line 804 corresponds to data output by the classification model after 10 epochs of training and the second line 806 corresponds to data output by the classification model after 30 epochs of training. Similarly, the third line 808 corresponds to data output by the classification model after 60 epochs of training and the fourth line 810 corresponds to data output by the classification model after 120 epochs of training.

As the amount of training increased for the classification model, the value of Z' increased as well. For example, the value of Z' for the first line 804 is approximately 0.87 and the value of Z' for the fourth line 810 is approximately 0.96. As such, the classification model may classify cells into two classes with a larger degree of separation between cells of a positive class and cells of a non-positive class as the model trains. In this way, the utilization of a Z' based cost function when training the classification model increases the ability of the model to automatically classify cells given a positive control and a negative control as training inputs.

Thus, the classification model(s) described herein may provide an approach to directly, automatically, and rapidly solve the feature selection, metric formulation, and effect size problem. Measurements of effect size may be visualized immediately after inference in a continuous automated workflow. The approach disclosed herein includes the added benefit of scoring (and thus potentially classifying) each object of interest (e.g., cells for typical histological bioassays using fluorescence microscopy) using the selected features and/or similarity (regression score) with training references. This can inform the biologists which cells are effected and which are not, giving visual feedback of the biology differences and enabling further analysis, discovery, and learning.

Further, the approach disclosed herein takes full advantage of modern deep neural network technology with supervised learning while avoiding the usual bottleneck of requiring (typically substantial) human input for annotated datasets for training, validation, and testing. Instead, the data is the same data already routinely used for bioassays. For example, for fluorescence microscopy bioassays using multiple well plates, a plate map file is routinely generated showing information of how wells are unique for the experiment. Aside from the images of the wells, the plate map information is generally the only additional information required in order to train the classification model described herein.

As explained previously, the effect size loss may be included as part of the cost function used to train the classification model, and using the required classes as input drives the design of the classification model that supplies the respective class probability predictions. This can generalize to multiple classes instead of two (e.g., binary) classes. Note that other effect size metrics may be used, such as the standardized mean difference. The method of classifying objects described herein includes all classification problems where distinct groups of data are to be analyzed for key features that distinguish differences. In some examples, clustering may be used to post-process the features learned as a result of training with the effect size loss. The respective clusters may be better separated.

Thus, as described above with respect to FIGS. 2-4, field of view (FOV) images containing many cells (or other target objects) are converted into a large number of individual cell (or other target object) instance images to use as input for a classification model, or two classification models (e.g., a positive DNN and a negative DNN). FOV images with known overall statistical context (such as they came from a well labelled as a positive control well, for example) can be used for training the model(s). Instance classes are learned implicitly by the training paradigm. FOV images with and without known statistical context can be used for inference, where each instance image is scored for how well it matches each class. As described above, for example, the two classes are the positive control and the negative control.

Each instance image used for training has ground truth annotation, for example, as being from a positive control well or a negative control well (represented by 1 or 0, respectively by convention). This well label information typically is contained in plate map databases and associated files such as those output from standard lab management applications. Thus, data already available can be used to fully automate the bioassay analysis, including training. The well class (for example, positive or negative control class) is used as the proxy ground truth for each instance object. Since learning occurs from each batch, the batch instance statistics are the usual source of feedback for backpropagation used to update layer weights. Thus, learning is inherently statistically based, so not having exact instance annotation (e.g., ground truth, labels, a priori knowledge of the correct classification of each instance) does not prevent learning instance classes.

The loss functions for the positive and negative well class predictions, as mentioned above, can be loss functions known in standard practice in the art such as mean squared error (MSE), squared error, absolute value of error, etc. These loss functions reduce respective classification errors, which tends to also improve Z' to some extent, but not as well as a loss function including Z' loss. The Z' loss function tends to narrow the respective distributions of each class prediction while also separating them. The resulting encoder output features have respective positive cell features and negative cell features that tend to be better separated clusters after using the Z' loss in training.

The classification model(s) may include a convolutional neural network encoder creating the features and a layer based classifier using these features as inputs. The classifier provides regression outputs (one for positive well class prediction and the other for negative well class prediction) ranging from 0.0 to 1.0. The model outputs include (but are not limited to) the respective classes of interest and (optionally) the respective features (encoder outputs). In the example applied to well classification of individual cells, the instance images (e.g., sub-images) of cells detected (via template matching) were isolated within bounding boxes with respective colors for each class, white for positive and black for negative, as shown in FIG. 5. The aggregate results of all the predictions may be shown as well in a heat map, as shown in FIG. 6.

Further, machine learning analysis of features can be used to teach biologists what features are most impacted by the differences in controls. For example, using methods of variational autoencoders (VAEs), the manipulation of the encoder output features may be enabled to see how respective images change by converting the features to images with a decoder trained using the encoder (an autoencoder). A VAE is an example of a model and strategy for doing just this. This and other practices may be applied to determine what each feature represents, and may be used, for example, to further refine the biochemical strategies used in respective biological assay protocols, and or additional image analysis.

The technical effect of classifying objects with a classification model trained with an effect-size based loss function is that the objects may be grouped into multiple (e.g., two) classes with a maximized group separation without demanding a user actually identify the features that result in the maximized effect size. Another technical effect of the classification model trained as disclosed herein is that object location information may be used to automatically classify training images of the objects and generate ground truth labels without demanding users to manually annotate the images, expending the training process and facilitating larger amounts of training data to be created, which may result in more robust classification models.

The disclosure also provides support for a method comprising receiving one or more images of a plate including a plurality of wells, each well including a plurality of cells, the plurality of wells including a first control well, a second control well, and at least one test well, classifying one or more cells from the at least one test well using a trained classification model, the trained classification model trained based on training data including instance images of the first control well and the second control well formed from the one or more images of the plate and further based on an effect size loss function, and outputting an indication of the classified one or more cells. In a first example of the method, classifying the one or more cells from the at least one test well using the trained classification model comprises generating, from the one or more images of the plate, a respective test instance image of each cell of a plurality of cells in the at least one test well, entering each respective test instance image as input to the trained classification model, and receiving a classification score for each respective test instance image as output from the trained classification model, wherein the classification score for a given respective test instance image indicates a likelihood a cell imaged in the given respective test instance image has an effect that matches an effect of cells in the first control well or the second control well. In a second example of the method, optionally including the first example, outputting the indication comprises outputting a heat map illustrating, for each well of the plate, a respective mean classification score calculated from classification scores output by the classification model. In a third example of the method, optionally including one or both of the first and second examples, the trained classification model is trained based on training data including first instance images of cells in the first control well and second instance images of cells in the second control well, the first instance images and the second instance images formed from the one or more images of the plate, the training data further including a first ground truth label for each first instance image and a second ground truth label for each second instance image. In a fourth example of the method, optionally including one or more or each of the first through third examples, the method further comprises training an initial classification model to form the trained classification model, the training including receiving, from the initial classification model, a respective classification score for each input first instance image and each input second instance image, determining, for each input first instance image, a respective first loss based on the received respective classification score for the input first instance image relative to the first ground truth label for the input first instance image, determining, for each input second instance image, a respective second loss based on the received respective classification score for the input second instance image relative to the second ground truth label for the input second instance image, calculating a cost function based on each first loss, each second loss, and the effect size loss function, and updating the initial classification model based on the cost function to form the trained classification model. In a fifth example of the method, optionally including one or more or each of the first through fourth examples, the method further comprises calculating the effect size loss function based on the respective classification score for each input first instance image and each input second instance image. In a sixth example of the method, optionally including one or more or each of the first through fifth examples, calculating the effect size loss function based on the respective classification score for each input first instance image and each input second instance image comprises calculating a first mean classification score and a first standard deviation based on the respective classification score for each input first instance image, calculating a second mean classification score and a second standard deviation based on the respective classification score for each input second instance image, and calculating the effect size loss function based on the first mean classification score, the second mean classification score, the first standard deviation, and the second standard deviation.

The disclosure also provides support for a method, comprising receiving one or more images of a plate including a plurality of wells, each well including a plurality of cells, the plurality of wells including a positive control well, a negative control well, and at least one test well, forming a plurality of first training data pairs from the one or more images, each first training data pair comprising a respective instance image of a respective positive cell from the positive control well and an automatically-generated, corresponding first ground truth label, forming a plurality of second training data pairs from the one or more images, each second training data pair comprising a respective instance image of a respective negative cell from the negative control well and an automatically-generated, corresponding second ground truth label, training a classification model using the plurality of first training data pairs and the plurality of second training data pairs, and classifying one or more cells from the at least one test well using the trained classification model. In a first example of the method, the method further comprises receiving plate information indicating a respective location and identity of the positive control well, the negative control well, and the at least one test well, wherein each first ground truth label is automatically generated based on the identity of the positive control well from the plate information, and wherein each second ground truth label is automatically generated based on the identity of the negative control well from the plate information. In a second example of the method, optionally including the first example, the method further comprises outputting a visualization of the classification of the one or more cells for display on a display device. In a third example of the method, optionally including one or both of the first and second examples, the visualization comprises a heat map of the plate with a mean classification score for each well of the plurality of wells, each mean classification score based on the classifying of cells within that well. In a fourth example of the method, optionally including one or more or each of the first through third examples, training the classification model comprises training the classification model based on an effect size-based loss function calculated from output received from the classification model. In a fifth example of the method, optionally including one or more or each of the first through fourth examples, training the classification model based on the effect size-based loss function calculated from output received from the classification model comprises entering each first training data pair as input to the classification model, receiving, as output from the classification model, a respective first regression value for each input first training data pair, determining a first mean regression value and a first standard deviation based on each first regression value, entering each second training data pair as input to the classification model, receiving, as output from the classification model, a respective second regression value for each input second training data pair, determining a second mean regression value and a second standard deviation based on each second regression value, determining a $Z'$ loss value based on the first mean regression value, the second mean regression value, the first standard deviation, and the second standard deviation, and training the classification model based on the $Z'$ loss value. In a sixth example of the method, optionally including one or more or each of the first through fifth examples, training the classification model based on the $Z'$ loss value comprises training the classification model based on a cost function including the $Z'$ loss value, the cost function comprising a weighted sum of the $Z'$ loss value, a sum of positive losses, and a sum of negative losses. In a seventh example of the method, optionally including one or more or each of the first through sixth examples, the method further comprises determining a positive loss value for each first training data pair based on the respective first regression value output by the classification model for that first training data pair relative to the first ground truth label for that first training data pair, determining a negative loss value for each second training data pair based on the respective second regression value output by the classification model for that second training data pair relative to the second ground truth label for that second training data pair, calculating the sum of positive losses by summing each positive loss value, and calculating the sum of negative losses by summing each negative loss value.

The disclosure also provides support for a system, comprising memory storing instructions, and one or more processors configured to execute the instructions to receive one or more images of a plate including a plurality of wells, each well including a plurality of cells, the plurality of wells including a first control well, a second control well, and at least one test well, classify one or more cells from the at least one test well using a trained classification model, the trained classification model trained based on training data including instance images of the first control well and the second control well formed from the one or more images of the plate and further based on an effect size loss function, and output a visualization of the classified one or more cells for display on a display device. In a first example of the system, the one or more images are fluorescent microscopy images. In a second example of the system, optionally including the first example, the effect size-based loss function is determined based on mean and standard deviation values of batches of output from the classification model during training of the classification model. In a third example of the system, optionally including one or both of the first and second examples, each instance image of the first control well includes a first ground truth annotation and each instance image of the second control well includes a second ground truth annotation, each first ground truth annotation indicating that an associated instance image of the first control well belongs to a first class, each second ground truth annotation indicating that an associated instance image of the second control well belongs to a second class, wherein the output from the classification model during training of the classification model includes a regression value for each input instance image indicative of a likelihood that the input instance image belongs to the first class or to the second class. In a fourth example of the system, optionally including one or more or each of the first through third examples, the classification model is a convolutional neural network.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   receiving one or more images of a plate including a plurality of wells, each well including a plurality of cells, the plurality of wells including a first control well, a second control well, and at least one test well;
   classifying one or more cells from the at least one test well using a trained classification model, the trained classification model trained based on training data including instance images of the first control well and the second control well formed from the one or more images of the plate and further based on an effect size loss function; and
   outputting an indication of the classified one or more cells.

2. The method of claim 1, wherein classifying the one or more cells from the at least one test well using the trained classification model comprises:
   generating, from the one or more images of the plate, a respective test instance image of each cell of a plurality of cells in the at least one test well;
   entering each respective test instance image as input to the trained classification model; and
   receiving a classification score for each respective test instance image as output from the trained classification model, wherein the classification score for a given respective test instance image indicates a likelihood a cell imaged in the given respective test instance image has an effect that matches an effect of cells in the first control well or the second control well.

3. The method of claim 2, wherein outputting the indication comprises outputting a heat map illustrating, for each well of the plate, a respective mean classification score calculated from classification scores output by the classification model.

4. The method of claim 1, wherein the trained classification model is trained based on training data including first instance images of cells in the first control well and second instance images of cells in the second control well, the first instance images and the second instance images formed from the one or more images of the plate, the training data further including a first ground truth label for each first instance image and a second ground truth label for each second instance image.

5. The method of claim 4, further comprising training an initial classification model to form the trained classification model, the training including:
   receiving, from the initial classification model, a respective classification score for each input first instance image and each input second instance image;
   determining, for each input first instance image, a respective first loss based on the received respective classification score for the input first instance image relative to the first ground truth label for the input first instance image;
   determining, for each input second instance image, a respective second loss based on the received respective classification score for the input second instance image relative to the second ground truth label for the input second instance image;
   calculating a cost function based on each first loss, each second loss, and the effect size loss function; and
   updating the initial classification model based on the cost function to form the trained classification model.

6. The method of claim 5, further comprising calculating the effect size loss function based on the respective classification score for each input first instance image and each input second instance image.

7. The method of claim 6, wherein calculating the effect size loss function based on the respective classification score for each input first instance image and each input second instance image comprises:
   calculating a first mean classification score and a first standard deviation based on the respective classification score for each input first instance image;
   calculating a second mean classification score and a second standard deviation based on the respective classification score for each input second instance image; and
   calculating the effect size loss function based on the first mean classification score, the second mean classification score, the first standard deviation, and the second standard deviation.

8. A system, comprising:
   memory storing instructions; and
   one or more processors configured to execute the instructions to:
      receive one or more images of a plate including a plurality of wells, each well including a plurality of cells, the plurality of wells including a first control well, a second control well, and at least one test well;
      classify one or more cells from the at least one test well using a trained classification model, the trained classification model trained based on training data including instance images of the first control well and the second control well formed from the one or more images of the plate and further based on an effect size loss function; and
      output a visualization of the classified one or more cells for display on a display device.

9. The system of claim 8, wherein the one or more images are fluorescent microscopy images.

10. The system of claim 8, wherein the effect size-based loss function is determined based on mean and standard deviation values of batches of output from the classification model during training of the classification model.

11. The system of claim 10, wherein each instance image of the first control well includes a first ground truth annotation and each instance image of the second control well includes a second ground truth annotation, each first ground truth annotation indicating that an associated instance image of the first control well belongs to a first class, each second ground truth annotation indicating that an associated instance image of the second control well belongs to a second class, wherein the output from the classification model during training of the classification model includes a regression value for each input instance image indicative of a likelihood that the input instance image belongs to the first class or to the second class.

12. The system of claim 8, wherein the classification model is a convolutional neural network.

\* \* \* \* \*